(12) United States Patent
Porter-Coote

(10) Patent No.: US 8,393,352 B2
(45) Date of Patent: Mar. 12, 2013

(54) CONTROL SYSTEM AND METHOD FOR WATER SUPPLY

(75) Inventor: Robert Porter-Coote, Jerrys Plains (AU)

(73) Assignee: H2O Organiser Pty Ltd, New South Wales (AU)

( * ) Notice: Subject to any disclaimer, the term of this patent is extended or adjusted under 35 U.S.C. 154(b) by 130 days.

(21) Appl. No.: 13/060,589

(22) PCT Filed: Aug. 25, 2009

(86) PCT No.: PCT/AU2009/001087
§ 371 (c)(1),
(2), (4) Date: May 6, 2011

(87) PCT Pub. No.: WO2010/022442
PCT Pub. Date: Mar. 4, 2010

(65) Prior Publication Data
US 2011/0209770 A1  Sep. 1, 2011

(30) Foreign Application Priority Data
Aug. 25, 2008  (AU) ................................ 2008207488

(51) Int. Cl.
*F16K 31/02* (2006.01)
(52) U.S. Cl. ........... 137/487.5; 137/624.13; 137/624.14; 137/456; 417/12; 417/18; 417/26
(58) Field of Classification Search ............. 137/624.13, 137/624.14, 456, 487.5; 417/12, 18, 26, 417/28
See application file for complete search history.

(56) References Cited

U.S. PATENT DOCUMENTS

| 4,249,565 | A | * | 2/1981 | Brust | 137/495 |
| 4,387,850 | A | * | 6/1983 | Gerber | 239/124 |
| 4,589,435 | A | * | 5/1986 | Aldrich | 137/102 |
| 4,735,231 | A | * | 4/1988 | Jacquet | 137/459 |
| 4,911,200 | A | * | 3/1990 | Ben-Arie | 137/486 |
| 4,926,901 | A |   | 5/1990 | Waltenburg | |
| 5,004,014 | A | * | 4/1991 | Bender | 137/624.12 |
| 5,038,820 | A | * | 8/1991 | Ames et al. | 137/486 |

(Continued)

*Primary Examiner* — John Rivell
*Assistant Examiner* — Minh Le
(74) *Attorney, Agent, or Firm* — Novak Druce Connolly Bove + Quigg LLP

(57) ABSTRACT

Known water supply systems are fed from a source of water such as a tank (6) via a pump (5) to outlets which are occludable by means of a cock (C1-C3). A water pressure sensitive electrical switch (S1) is located downstream of the pump (5) and upstream of the outlets. The switch (S1) is connected in series with an electrical supply for the pump and turns the pump on in response in a drop in water pressure downstream of the switch. Similarly the pump is turned off in response to water pressure downstream to the switch reaching a predetermined minimum pressure, A control system is disclosed in the form of a timer (T) connected in parallel with the pump (5) and energized via the switch (S1). A normally closed safeguard switch (S2) is connected in series with the pump and rendered non-conductive by the timer (T) being energized for a predetermined period. The safeguard switch (S2) prevents the pump (5) operating continuously for more than a predetermine period, typically 15-30 minutes, As a consequence leaks in the system supplied by the pump (5) do not result in excessive water loss from the tank (6), A system and method to prevent water loss in a reticulated town water supply system is also disclosed by means of a flow detector (FD), a timer (T) and a normally open solenoid valve (SV).

20 Claims, 3 Drawing Sheets

U.S. PATENT DOCUMENTS

| | | |
|---|---|---|
| 5,064,347 A | 11/1991 | LaValley, Sr. |
| 5,409,037 A * | 4/1995 | Wheeler et al. ............... 137/551 |
| 5,503,175 A * | 4/1996 | Ravilious et al. ................. 137/1 |
| 5,580,221 A * | 12/1996 | Triezenberg ................. 417/44.2 |
| 6,039,543 A * | 3/2000 | Littleton ......................... 417/12 |
| 6,099,264 A * | 8/2000 | Du ................................ 417/300 |
| 6,164,319 A | 12/2000 | Cochran et al. |
| 6,209,576 B1 * | 4/2001 | Davis ......................... 137/487.5 |
| 6,374,846 B1 * | 4/2002 | DeSmet ..................... 137/15.01 |
| 6,543,479 B2 * | 4/2003 | Coffey et al. ............ 137/624.11 |
| 6,568,426 B1 * | 5/2003 | Chapman ................. 137/565.34 |
| 6,708,722 B1 * | 3/2004 | Goodenough ............. 137/487.5 |
| 7,204,270 B2 * | 4/2007 | Hendrix ................... 137/624.12 |
| 7,299,814 B2 * | 11/2007 | Fenton ............................. 137/1 |
| 7,900,647 B2 * | 3/2011 | Tornay ....................... 137/15.11 |
| 2004/0226614 A1 * | 11/2004 | Lane .......................... 137/487.5 |
| 2005/0126635 A1 * | 6/2005 | Addink et al. ............. 137/487.5 |
| 2010/0000615 A1 * | 1/2010 | Finlayson ................. 137/487.5 |
| 2011/0073189 A1 * | 3/2011 | Elbert et al. ...................... 137/1 |

* cited by examiner

CONTROL SYSTEM AND METHOD FOR WATER SUPPLY

FIELD OF THE INVENTION

The present invention relates to a water supply system fed from a source of water. Typically such water supply systems are available at rural dwellings where no reticulated town water supply is available in which case the supply is via a pump to at least one outlet which is able to be occluded. Alternatively the water supply system is a reticulated town water supply system.

Such rural water supply systems generally have source of harvested water such as a rain water tank, a dam, a stream, or similar. So, particularly in times of drought, it is of the utmost importance that the source of water not be depleted by water being inadvertently pumped from the tank. The cause of the inadvertent pumping may be an outlet such as a garden hose which has been left running in error, a pipe downstream of the pump which has developed a leak, a stock trough the ball valve of which has been damaged by cattle or other stock, an act of vandalism in relation to the downstream equipment, and the like.

GENESIS OF THE INVENTION

The genesis of the present invention is a desire to provide a control system to safeguard against excessive water loss in the event of such a problem arising. Such a control system would substantially prevent the situation arising where a leak which developed during the night, when the occupants of the house were asleep or absent from the property, for example, resulted in the entire contents of the harvested water being pumped out of the tank or reservoir and thereby going to waste. Such a situation requires the source of water to be replenished at considerable expense by means of a water carter, if available.

BACKGROUND ART

It has been proposed in U.S. Pat. No. 6,568,426 (to which WO99/63225 corresponds) to provide a manually operated timer switch, which is pressed each time the user of a caravan, for example, wishes to operate a tap. In this way irritating intermittent operation of the water pump is avoided, for example brought about by very low volume leaks. However, the abovementioned prior art arrangement suffers from the significant disadvantage that automatic equipment such as a washing machine or dishwasher cannot be allowed to operate automatically. Instead, manual intervention is required on each occasion where the washing machine or dishwasher requires a fresh load of water. Similarly self monitoring flow valve applications triggered by a demand for water, cannot function with this prior art arrangement. It is not known by the applicant whether this prior art arrangement has ever been used commercially.

U.S. Pat. No. 5,064,347 discloses a system for preventing water loss from a pump supply system which operates from a water well. Whether the pump is above ground or submerged in the well itself, when the pump of this system is de-energized, it is not possible for water to flow upwardly out of the well and through the non-operative pump. Thus de-energizing the pump stops the flow of water from the well.

However, in the case of a source of harvested water such as a rain water tank, or a dam, which is always above ground level, de-energizing the pump does not necessarily stop the flow because water can still flow by either gravity flow, or by means of a syphon, from the tank or dam through the de-energized pump.

SUMMARY OF THE INVENTION

In accordance with a first aspect of the present invention there is disclosed a control system to safeguard against water loss in a water supply system fed from a source of water via a pump to at least one occludable outlet, said water supply system having a water pressure sensitive electrical switch located downstream of said pump and upstream of said outlet(s), said electrical switch being connected in series with an electrical supply for said pump, turning said pump on in response to a drop in water pressure downstream of said switch and turning said pump off in response to water pressure downstream of said switch reaching a predetermined minimum pressure; said control system comprising a timer connected in parallel with said pump and energized via said water pressure sensitive electrical switch, a normally closed safeguard switch connected in series with said pump and being rendered non-conductive by said timer being energized for a predetermined period, and a normally open valve connected in series with said pump and connected to said timer, whereby said safeguard switch prevents said pump operating continuously for more than said predetermined period and said normally open valve is closed by said timer when said predetermined time is exceeded to prevent water flowing through the non-operating pump.

In accordance with a second aspect of the present invention there is disclosed a method of safeguarding against excessive water loss in a water supply system fed from a source of water via a pump to at least one occludable outlet, said water supply system having a water pressure sensitive electrical switch located downstream of said pump and upstream of said outlet(s), said electrical switch being connected in series with an electrical supply for said pump, turning said pump on in response to a drop in water pressure downstream of said switch and turning said pump off in response to water pressure downstream of said switch reaching a predetermined minimum pressure; said method comprising the step of limiting the time of continuous operation of said pump to a predetermined maximum time and after said predetermined maximum time activating a normally closed valve connected in series with said pump to prevent water flowing through the non-operative pump.

BRIEF DESCRIPTION OF THE DRAWINGS

A preferred embodiment of the present invention will now be described with reference to the drawings in which.

DETAILED DESCRIPTION

Figure 1:
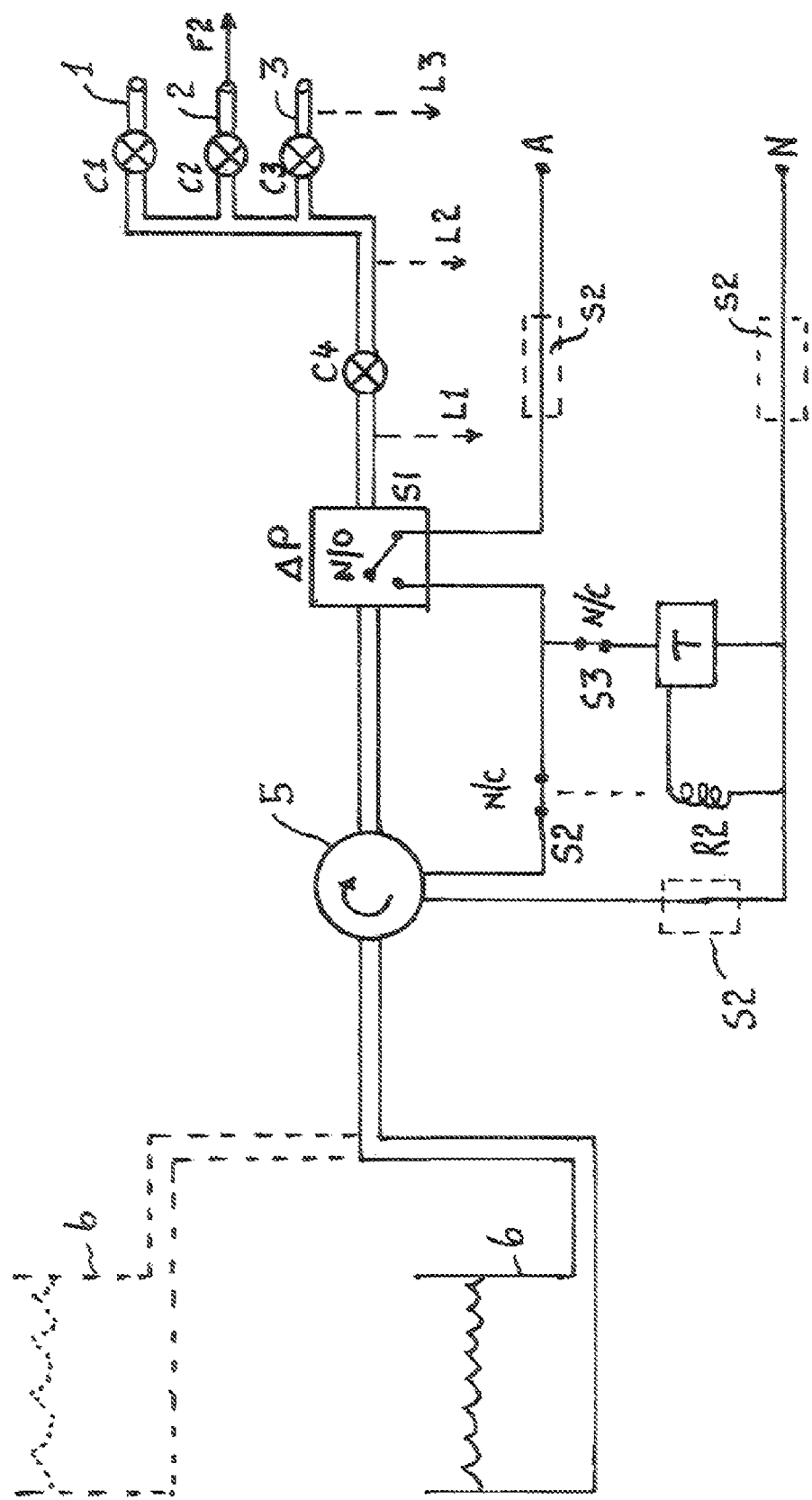
FIG. 1 is a schematic liquid flow and electrical circuit diagram of the arrangement of a first embodiment.

As seen in FIG. 1, three outlets 1, 2 and 3 are each provided with a corresponding tap or cock C1-C3. Each of the outlets could represent a hand basin, a shower, a washing machine, a garden hose, stock trough, or like domestic, rural or commercial outlets. Upstream of the three cocks C1-C3 is normally a main cock C4 which enables the downstream piping to be isolated for the purposes of repairs, changing tap washers and the like. The main cock C4 is supplied by a pump 5 via a pressure sensitive switch S1 which is normally open when the pressure in the pipe between the switch S1 and the main cock C4 exceeds a predetermined minimum pressure. This indicates that there is no open cock C1-C3 and thus no present demand for water. However, in the event that water is demanded at any of the outlets 1-3 then the pressure within the piping system drops and thus the switch S1 closes to complete an operating circuit for the pump 5 (which is preferably an AC pump and supplied by a mains supply having an active terminal A and a neutral terminal N). The pump 5 is supplied with water by means of a tank 6 which, as indicated by solid lines in FIG. 1, is preferably arranged to have a water level lower than the level of the pump 5. As indicated by broken lines in FIG. 1, the tank 6 could be positioned above the pump 5.

Connected between the switch S1 and the pump 5 is a timer T which is connected in series with a reset switch S3 which is normally closed. The timer T is connected to a relay having a relay coil R2 and a pair of normally closed contacts (constituting a safeguard switch S2) which are operated by means of the relay coil R2.

The operation of the circuit of FIG. 1 is as follows: On each occasion that the switch S1 is activated, the pump 5 commences operation and the timer T is also energized thereby beginning to count a predetermined period which typically is in the range of 15-30 minutes. This time is selected to be just longer than the maximum time for which a shower may be taken, the dishwashing machine operated for a single part of its cycle, the washing machine operated for a single part of its cycle, and so on.

If the demand for water is caused by a flow F2 via cock C2, for example, then the pump 5 operates to provide the requested water. Provided that the cock C2 is turned off within the predetermined time period, the timer is not activated and the pump 5 ceases pumping because there is no longer a demand for water and so the pressure rises to operate the switch S1.

However, in the event that there is a leak L1-L3 (or similar water loss circumstance) at any of the positions of the pipework indicated, or a person forgets to turn off the cock C2 (for example, whilst watering the lawn or garden), then the timer T reaches its predetermined time. When this happens the relay coil R2 is energized, thereby opening the normally closed switch S2 and stopping the pump 5. This prevents the tank 6 being inadvertently emptied.

It soon becomes apparent to the household that there is no pressurised water supply and thus the reason for this is investigated. For example, it may be that the person who neglected to turn off the cock C2 remembers this failure and turns off the cock C2. Alternatively, the leak (any one or more of L1-L3) which caused the problem can be identified by the resultant puddle of water (or area of moist soil, green grass, or similar) and rectified. Once the cause of the problem has been rectified, the reset switch S3 can be momentarily operated, thereby resetting the timer T and allowing it to be re-energized via the switch S1.

An advantage of having the tank 6 lower than the pump 5 (as indicated in solid lines in FIG. 1) is that water cannot siphon through the pump 5 in the event of a leak. However, under these circumstances the pump 5 may not be self-priming. In the alternative, if the tank 6 is positioned above the pump 5 (as indicated by dashed lines in FIG. 1), then the pump 5 will be self-priming. However, in the event of an overnight leak, for example, even though the pump 5 is disabled by the timer T, a small flow of water may still flow past the impeller of the pump 5 and thereby contribute to the leak. However, the total flow will be relatively small and thus the danger of the tank or other source of water being inadvertently emptied will be substantially avoided.

Figure 2:
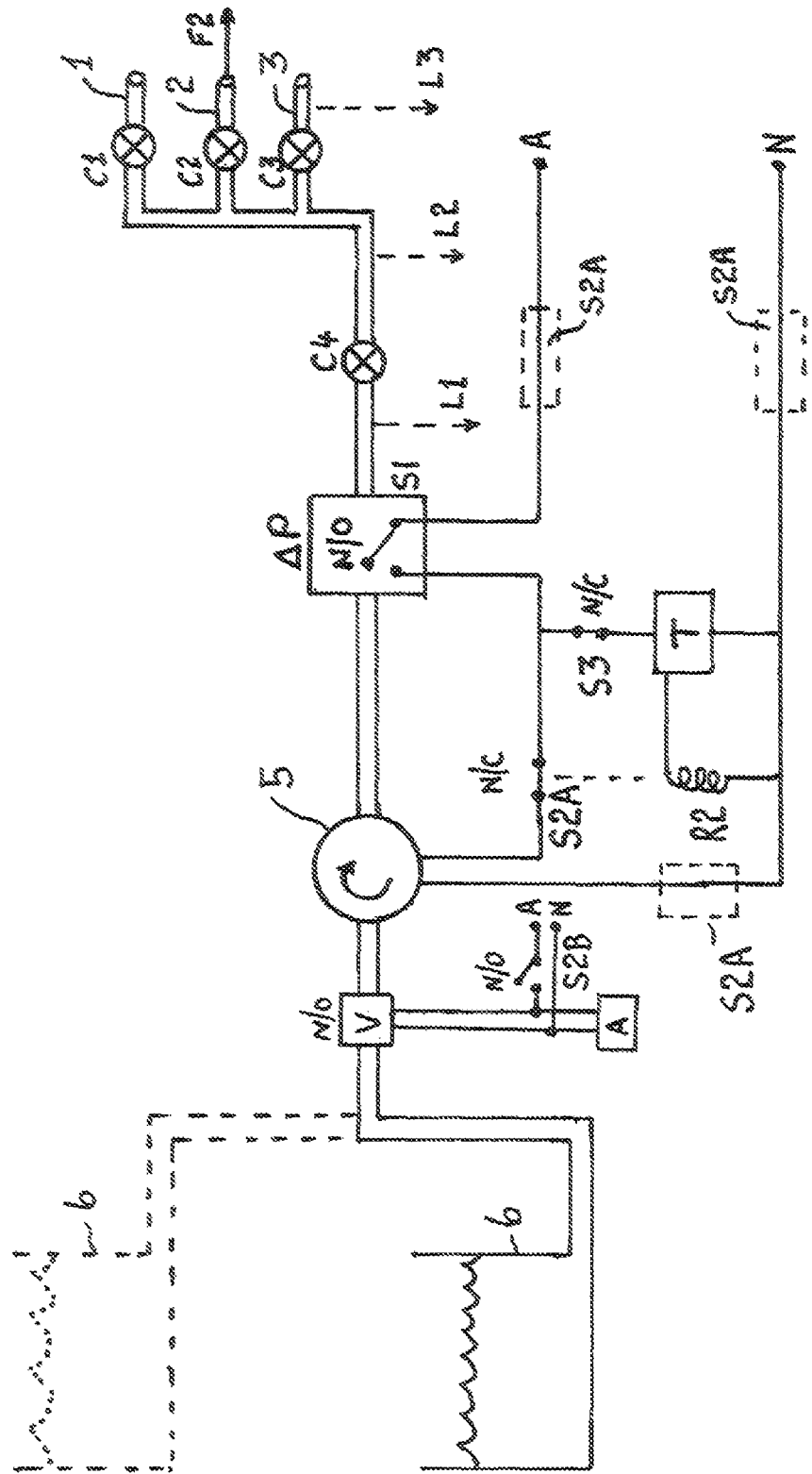
FIG. 2 is a diagram similar to FIG. 1 but of a second embodiment.

Turning now to FIG. 2, the arrangement of a second embodiment is illustrated. Those components which are the same as for FIG. 1 retain the same designation numbers. It will be seen that the relay R2 is provided with two sets of contacts designated S2A and S2B respectively. Contacts S2A in FIG. 2 are normally closed and function as contacts S2 of FIG. 1. However, contacts S2B are normally open and are used to connect both a solenoid valve V and an alarm A to the active A and neutral N of the mains supply.

In the event of leak or like circumstance, after the timer T reaches its predetermined (and adjustable) maximum time, the relay R2 is energized. Thus normally closed contacts S2A open thereby halting the operation of the pump 5 as before. In addition, the normally open contacts S2B close, hereby energizing both the solenoid valve V and the alarm A. The alarm A can be a visible and/or audible alarm such as a flashing lamp or buzzer, bell, or the like.

The solenoid valve V is normally open but when energized (only when the pump 5 is stopped) closes to prevent any siphoning action through the pump 5. Although the solenoid valve V is illustrated as connected to the pump inlet, it could be connected to the pump outlet instead. As before, pressing the reset switch S3 de-energizes the relay R2, returns contacts S2A and S2B to their normal condition, and resets the timer T.

Figure 3:
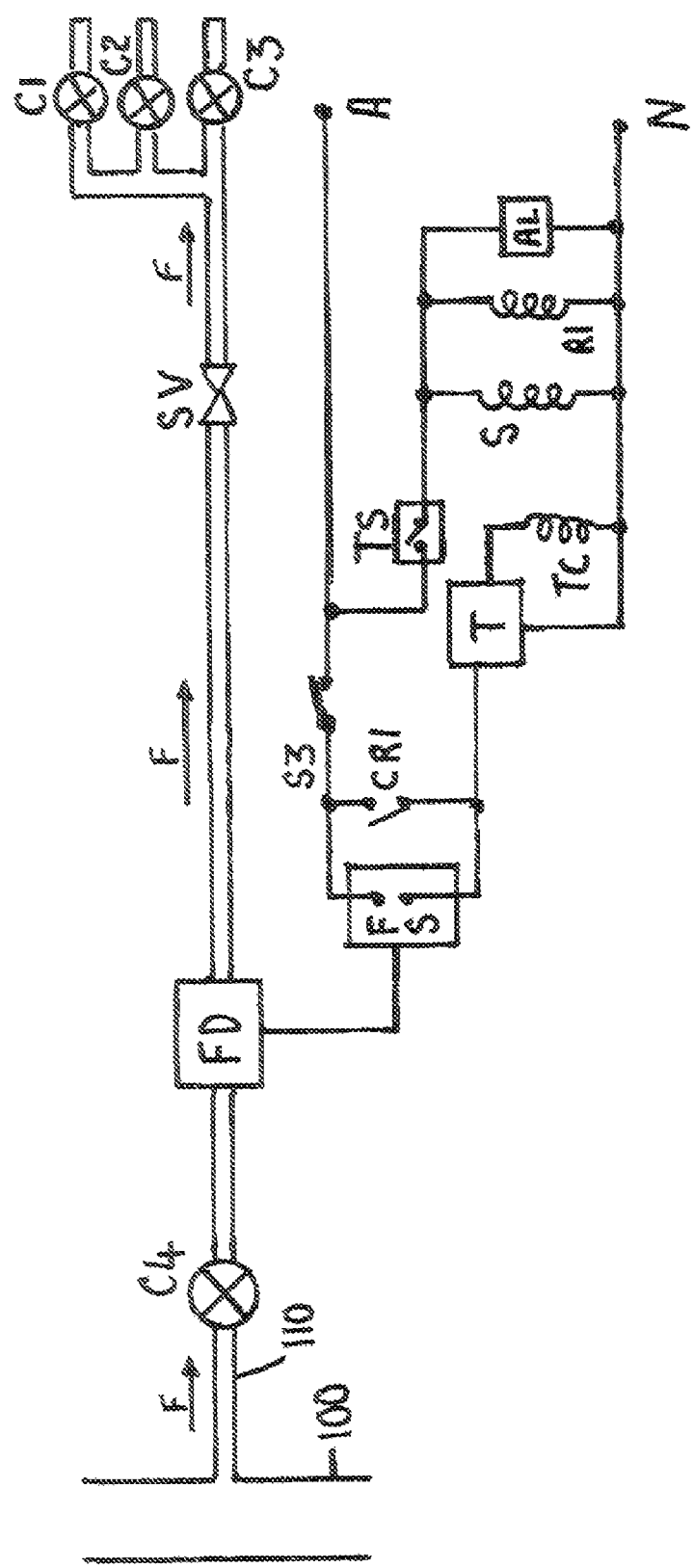
FIG. 3 is a similar circuit diagram but of a third embodiment.

Turning now to FIG. 3, a third embodiment of the present invention is illustrated which is applicable to reticulated town water supplies which have a mains supply pipe 100 and a branch supply pipe 110. The direction of water flow is as indicated by arrows F. A normally open main cock C4 as before enables the entire system to be closed off for maintenance. Interposed in the branch pipe 110 between the main cock C4 and the taps or cocks C1-C3 (which are as before) are a flow detector FD and a solenoid valve SV having a solenoid coil S.

The flow detector FD is associated with a flow switch FS which is open when there is no flow and closed when flow is detected. Connected in parallel with the flow switch FS is a pair of normally open relay contacts CR1 which are operable by a relay R1. A normally closed reset switch S3 connects the flow switch FS and relay contacts CR1 to an active line A of an AC mains electric supply (typically 240V 50 Hz or 110V 60 Hz).

A timer T as before has a normally open timer switch TS energized by a timer coil TC. An alarm AL is connected in parallel with the solenoid coils and relay R1, this parallel connection being connected to the active A via the timer switch TS.

In operation, once flow is detected, the flow switch FS is closed thereby connecting the timer T to the active A and starting the count for a predetermined (and adjustable) time. If the flow stops during this period, as is expected for normal operation, the flow switch FS re-opens and the timer T is deactivated.

However, if the flow does not stop because of some fault or a cock, eg C2, being left open, then the timer T energizes the timer coil TC which closes the timer switch TS. As a consequence, the relay R1 is energized, thereby closing the relay contacts CR1 which maintains the timer T energized and hence the timer switch TS is maintained closed.

In addition, the solenoid coil S is energized thereby closing the normally open solenoid valve SV and stopping the prolonged flow. Simultaneously the alarm AL (which can have various forms including audible, visual, SMS message etc) is activated.

Once the problem is rectified, the reset switch S3 can be momentarily depressed, thereby deactivating the timer T, relay R1 and solenoid coil S, which returns the circuit to its initial state.

The foregoing describes only some embodiments of the present invention and modifications, obvious to those skilled in the plumbing arts, can be made thereto without departing from the scope of the present invention.

For example, the switch S2 in FIG. 1 (and switch S2A in FIG. 2) can be located in any one of the three alternative positions illustrated by broken lines. In an alternating current system it is preferable to switch the active line rather than the neutral line.

Similarly, the pump 5 can be powered by DC circuit rather than an AC circuit, if desired.

In the event of a bushfire, for example, where a sprinkler system may be intended to operate for longer than the predetermined period and exhaustion of the harvested water supply is to be preferred to loss of the dwelling through fire, the timer T can be disabled, for example, by switching off its electrical supply.

Similarly a non-return valve can be located in the branch supply pipe 110 to prevent any possibility of contamination of the mains supply pipe 100.

Furthermore, a suitable timer T is that sold under the model number H3JA by the OMRON company of China. Although an AC mains supply is illustrated, a DC supply is also able to be used.

The term "comprising" (and its grammatical variations) as used herein is used in the inclusive sense of "including" or "having" and not in the exclusive sense of "consisting only of".

The invention claimed is:

1. A control system to safeguard against water loss in a water supply system fed from a source of water via a pump to at least one occludable outlet, said water supply system having a water pressure sensitive electrical switch located downstream of said pump and upstream of said outlet(s), said electrical switch being connected in series with an electrical supply for said pump, turning said pump on in response to a drop in water pressure downstream of said switch and turning said pump off in response to water pressure downstream of said switch reaching a predetermined minimum pressure; said control system comprising a timer connected in parallel with said pump and energized via said water pressure sensitive electrical switch, a normally closed safeguard switch connected in series with said pump and being rendered non-conductive by said timer being energized for a predetermined period, and a normally open valve connected in series with said pump and connected to said timer, whereby said safeguard switch prevents said pump operating continuously for more than said predetermined period and said normally open valve is closed by said timer when said predetermined time is exceeded to prevent water flowing through the non-operating pump.

2. The control system as claimed in claim 1 wherein said pump is located relative to said source of water to permit either gravity flow or syphoning of said water from said source through said pump when said pump is not operating.

3. The control system as claimed in claim 2 wherein said safeguard switch and said pump are connected in series to form a series connection which is connected in parallel with said timer.

4. The control system as claimed in 2 wherein a reset switch is connected in series with said timer.

5. The control system as claimed in claim 2 wherein said timer is reset after being de-energized by operation of said water pressure sensitive electrical switch.

6. The control system as claimed in claim 1 wherein said safeguard switch and said pump are connected in series to form a series connection which is connected in parallel with said timer.

7. The control system as claimed in 6 wherein a reset switch is connected in series with said timer.

8. The control system as claimed in claim 6 wherein said timer is reset after being de-energized by operation of said water pressure sensitive electrical switch.

9. The control system as claimed in claim 1 wherein a reset switch is connected in series with said timer.

10. The control system as claimed in claim 9 wherein said timer is reset after being de-energized by operation of said water pressure sensitive electrical switch.

11. The control system as claimed in claim 1 wherein said timer is reset after being de-energized by operation of said water pressure sensitive electrical switch.

12. The control system as claimed in claim 1 wherein said pump is located relative to said source of water to prevent syphoning of said water from said source through said pump when said pump is not operating.

13. The control system is claimed in claim 1 wherein an alarm is associated with said timer and activated when said safeguard switch is rendered non-conductive.

14. A method of safeguarding against excessive water loss in a water supply system fed from a source of water via a pump to at least one occludable outlet, said water supply system having a water pressure sensitive electrical switch located downstream of said pump and upstream of said outlet(s), said electrical switch being connected in series with an electrical supply for said pump, turning said pump on in response to a drop in water pressure downstream of said switch and turning said pump off in response to water pressure downstream of said switch reaching a predetermined minimum pressure; said method comprising limiting the time of continuous operation of said pump to a predetermined maximum time and after said predetermined maximum time activating a normally open valve connected in series with said pump to prevent water flowing through the non-operative pump.

15. The method as claimed in claim 14 comprising connecting a timer in parallel with said pump, energizing said timer via a said electrical switch, connecting a normally closed safeguard switch in series with said pump, and rendering said safeguard switch non-conductive after said timer has been energized for said predetermined time.

16. The method as claimed in claim 15 including connecting said safeguard switch and said pump in series to form a series connection, and connecting said series connection in parallel with said timer.

17. The method as claimed in claim 15 including connecting a reset switch in series with said timer.

18. The method as claimed in claim 17 including resetting said reset switch only after a leak downstream of said water pressure sensitive electrical switch has been rectified.

19. The method as claimed in claim 14 including locating said pump relative to said source of water to permit either gravity flow or syphoning of said water from said source through said pump.

20. The method as claimed in claim 14 including providing an alarm activated when said pump is turned off.

* * * * *